June 25, 1957     M. P. BEST ET AL     2,797,308
THERMOMETER CASE WITH BUILT-IN LIGHT UNIT
Filed Jan. 16, 1956
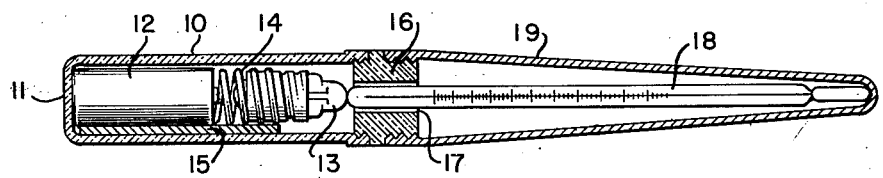
INVENTORS
MORTON P. BEST
HOWARD B. MORGANSTERN
By *Richard E. Bee*
AGENT

United States Patent Office 2,797,308
Patented June 25, 1957

2,797,308

THERMOMETER CASE WITH BUILT-IN LIGHT UNIT

Morton P. Best and Howard B. Morganstern, Brooklyn, N. Y.

Application January 16, 1956, Serial No. 559,162

2 Claims. (Cl. 240—6.4)

This invention relates to thermometers, thermometer cases and light units for illuminating the thermometer to enable thermometer readings to be taken in a darkened room. More particularly, the invention relates to a thermometer case having a built-in light unit for enabling the desired thermometer readings to be taken.

It is desirable that a device be available for illuminating a thermometer in a darkened room without producing a disturbing amount of visible light. Such a device would be handy, for example, in a hospital for enabling a doctor to secure thermometer readings without disturbing the patient or neighboring patients.

One form of device for housing a thermometer and having a built-in light unit has been heretofore proposed, but such device is much more cumbersome and includes more parts than is generally desirable. Such prior device comprises two compartments, one having a light unit therein and the other having a slotted element into the slot of which the thermometer is placed for securing a thermometer reading. Such a device has the particular disadvantage that the germ-laden portion of the thermometer must be placed entirely within the slot, hence requiring that the entire thermometer case be cleaned or sterilized after each reading. This contamination of the thermometer case is particularly objectionable where rectal thermometer readings are taken.

It is an object of the invention, therefore, to provide a new and improved thermometer case having a built-in light unit which is compact, readily portable, and requires a minimum number of parts in the construction thereof.

It is another object of the invention to provide a new and improved thermometer case having a built-in light unit and which is constructed so that the germ-laden portion of the thermometer need never touch the thermometer case while securing a thermometer reading.

For a better understanding of the present invention, together with other and further objects thereof, reference is had to the following description taken in connection with the accompanying drawing, the scope of the invention being pointed out in the appended claims.

The single figure of the drawing is a cross-sectional view of a thermometer case constructed in accordance with the present invention and, for illustration, is shown as including a thermometer therein.

Referring to the drawing, the thermometer case having a built-in light unit comprises an elongated tubular casing member 10 and an end member 11 for closing one end of the tubular casing member 10. In addition, the thermometer case includes a small battery 12 positioned coaxially within the tubular member 10 near the closed end 11 thereof. This battery may be, for example, an Everready type N dry cell which has a length of approximately 1 3/16 inches and a diameter of 7/16 of an inch.

The thermometer case further includes a small light bulb 13 positioned within the tubular member 10 near the other end thereof. Between the battery 12 and the light bulb 13 there is included a spring member 14 for preventing contact between one terminal of the battery 12 and one terminal of the light bulb 13. A return path for the battery-light bulb circuit may be provided, for example, by a thin metallic strip 15 which contacts both the metallic side of the battery 12 and the spring 14. The spring 14 is preferably designed so that the light bulb 13 may be screwed thereinto.

The thermometer case further includes a substantially light-opaque retaining member 16 having a hole 17 through the center thereof for partially closing the other end of the tubular member 10 for retaining the light bulb 13 within this tubular member 10. The diameter of the hole 17 is made slightly greater than the diameter of the stem of a thermometer 18 which is desired to be utilized with the thermometer case. In this manner, the hole 17 permits the upper portion of the thermometer stem to be inserted therein and pushed against the light bulb 13 to cause contact between the center terminals of the light bulb 13 and battery 12, thereby causing the light bulb 13 to light up. In addition, the thermometer case includes an elongated tubular cover member 19 which is closed at one end for covering the thermometer when not in use, one end of this cover member 19 being shaped to engage the first tubular member 10 so as to secure the cover member thereto. The cover member 19 may, as shown, be secured to the tubular member 10 by way of the retaining member 16, that is, the retaining member 16 may be provided with, for example, a screw thread for securing it to the tubular member 10, and the retaining member 16 may include a further threaded portion for engaging suitable internal threads on the cover member 19. This specific way of attaching the cover member 19 is intended as an example only because other ways of obtaining the desired attachment will be readily apparent to those skilled in the art. In particular, any of the known techniques for securing the two parts of a fountain pen may be utilized.

The tubular member 10, end member 11, retaining member 16, and the cover member 19 may be made of a molded plastic material.

When not in use, the thermometer 18 is carried within the thermometer case as shown in the drawing, the spring 14 serving to prevent contact between the light bulb 13 and battery 12. When it is desired to take a thermometer reading, the cover member 19 is removed and the thermometer 18 is removed from the hole 17 and, as the case may be, is placed in the patient's mouth. After the desired period of time has elapsed, the thermometer 18 is then removed from the patient's mouth and the upper end thereof is inserted back into the hole 17 and the thermometer is pressed against the light bulb 13 to cause contact between such light bulb and the battery 12. Because the thermometer 18 is in intimate contact with the light bulb 13, a beam of light is transmitted up to the stem of the thermometer 18, thereby illuminating the scale thereof and enabling the thermometer indication to be read. In this manner only a minimum of visible light will be radiated into the darkened room and the likelihood of disturbing neighboring patients is greatly reduced.

Before the cover member 19 is replaced, the thermometer 18 may be removed from the hole 17 and the germ-laden lower end thereof, that is, the end containing the mercury bulb may be immersed in a suitable disinfectant or otherwise sterilized. Subsequently, the thermometer 18 may be replaced in the hole 17 and the cover member 19 replaced, thereby rendering the thermometer in a condition whereby it may be readily carried about by the doctor.

Either the light bulb 13 or battery 12 may be replaced by, for example, unscrewing the retaining member 16, which then enables the battery 12 and light bulb 13 to be removed from the tubular member 10. In this connection, it should be noted that, as an alternative, the retaining member 16 may be permanently attached to the tubular member 10 and the end member 11 provided with, for example, a suitable thread arrangement for enabling this end 11 to be removable. In this case, the battery 12 and light bulb 13 may be removed by removing the end member 11.

The length of the hole 17 in the retaining member 16 should be such as to properly guide the thermometer stem against the light bulb 13 and to provide some support for the thermometer 18 when inserted therein. This support enables the thermometer 18 and cover member 19 to be replaced with a minimum of effort. Also it should be noted that the inside diameter of the cover member 19 need be only slightly greater than the diameter of the thermometer 18. This enables the thermometer case to be very compact in nature.

From the foregoing description of the invention, it will be apparent that the thermometer case of the present invention requires only a minimum of parts, is very compact, and readily portable. It may be provided, for example, with a suitable clasp for enabling it to be carried in one's shirt pocket like a fountain pen or mechanical pencil. In addition, the thermometer case is constructed so that thermometer readings may be obtained without placing the germ-laden portion of the thermometer in contact with the thermometer case, thus avoiding contamination of the thermometer case.

While there has been described what is at present considered to be the preferred embodiment of this invention, it will be obvious to those skilled in the art that various changes and modifications may be made therein without departing from the present invention, and it is intended, therefore, to cover all such changes and modifications as fall within the true spirit and scope of the invention.

What is claimed is:

1. A pocket-sized thermometer case having a built-in light unit for axially illuminating a clinical thermometer to facilitate the reading thereof, especially in a darkened room, the thermometer case comprising: an elongated tubular casing member; an end member closing one end of the tubular casing member; a small battery positioned coaxially within the tubular casing member with its bottom contiguous with the end member; a coil spring positioned coaxially within the tubular casing member with one end resting on the other end of the battery; a small light bulb coaxially positioned within the tubular casing member with its base threaded into the other end of the coil spring, the spring being of sufficient length and restoring force to normally prevent contact between the battery terminal and the light bulb terminal; a substantially light-opaque retaining member secured coaxially to the other end of the tubular casing member and resting firmly against the top of the light bulb for retaining the light bulb, spring, and battery securely in the indicated relationship, this retaining member having a coaxial hole through the center thereof, the diameter of this hole corresponding to the diameter of the thermometer stem for enabling the thermometer stem to be inserted therein and pushed against the light bulb to cause contact between the mentioned light bulb and battery terminals thereby causing axial illumination of the thermometer stem, the axial length of this hole being sufficient to properly guide the thermometer stem against the light bulb and to provide adequate support for the thermometer when it is not being illuminated; and an elongated tubular cover member which is closed at one end and has a diameter corresponding to the diameter of the first-mentioned tubular casing member, this tubular cover member serving to cover the thermometer when it is resting in the mentioned hole and not in use, this tubular cover member having the open end thereof shaped to secure it to the first mentioned tubular casing member in a coaxial manner.

2. A pocket-sized thermometer case having a built-in light unit for axially illuminating a clinical thermometer to facilitate the reading thereof, especially in a darkened room, the thermometer case comprising: a tubular casing member having a diameter which does not exceed four times the diameter of the thermometer stem and a length which does not exceed sixteen times the diameter of the thermometer stem; an end member closing one end of the tubular casing member; a small battery positioned coaxially within the tubular casing member with its bottom contiguous with the end member; a coil spring positioned coaxially within the tubular casing member with one end resting on the other end of the battery; a small light bulb coaxially positioned within the tubular casing member with its base threaded into the other end of the coil spring, the spring being of sufficient length and restoring force to normally prevent contact between the battery terminal and the light bulb terminal; a substantially light-opaque retaining member secured coaxially to the other end of the tubular casing member and resting firmly against the top of the light bulb for retaining the light bulb, spring, and battery securely in the indicated relationship, this retaining member having a coaxial hole through the center thereof, the diameter of this hole corresponding to the diameter of the thermometer stem for enabling the thermometer stem to be inserted therein and pushed against the light bulb to cause contact between the mentioned light bulb and battery terminals thereby causing axial illumination of the thermometer stem, the axial length of this hole being at least two times the diameter of the thermometer stem to properly guide the thermometer stem against the light bulb and to provide adequate support for the thermometer when it is not being illuminated; and an elongated tubular cover member which is closed at one end and has a diameter corresponding to the diameter of the first-mentioned tubular casing member, this tubular cover member serving to cover the thermometer when it is resting in the mentioned hole and not in use, this tubular cover member having the open end thereof shaped to secure it to the first-mentioned tubular casing member in a coaxial manner.

References Cited in the file of this patent

UNITED STATES PATENTS

| | | |
|---|---|---|
| 2,204,136 | King | June 11, 1940 |
| 2,225,405 | Osterman | Dec. 17, 1940 |
| 2,261,320 | Williams | Nov. 4, 1941 |
| 2,407,106 | Shelly | Sept. 3, 1946 |
| 2,554,854 | Chomes | May 29, 1951 |
| 2,663,791 | Hettrick | Dec. 22, 1953 |
| 2,670,427 | Barlet et al. | Feb. 23, 1954 |
| 2,708,712 | Jamieson | May 17, 1955 |
| 2,737,574 | Muller | Mar. 6, 1956 |
| 2,761,057 | Modell | Aug. 28, 1956 |